United States Patent [19]

Laganis et al.

[11] 4,179,423
[45] Dec. 18, 1979

[54] WATER-SOLUBLE POLYESTER IMIDE RESINS

[75] Inventors: Deno Laganis, Schenectady; Paul M. Begley, Scotia, both of N.Y.

[73] Assignee: Schenectady Chemicals, Inc., Schenectady, N.Y.

[21] Appl. No.: 890,798

[22] Filed: Mar. 27, 1978

Related U.S. Application Data

[63] Continuation of Ser. No. 694,432, Jun. 9, 1976, abandoned.

[51] Int. Cl.² ............... C08L 67/02; C08L 77/12; C08G 73/16
[52] U.S. Cl. ............... 260/29.2 N; 428/423; 428/474; 525/419; 525/437; 528/128; 528/170; 528/185; 528/188; 528/220; 528/229; 528/221; 528/273; 528/288; 528/289
[58] Field of Search ........... 260/29.2 N, 75 N, 47 CP, 260/63 N, 65, 857 PE; 528/289, 170, 128

[56] References Cited

U.S. PATENT DOCUMENTS

| | | | |
|---|---|---|---|
| 3,426,098 | 2/1969 | Meyers et al. | 260/841 |
| 3,663,467 | 5/1972 | Albright | 260/2.5 B |
| 3,957,741 | 5/1976 | Rembaum et al. | 526/312 |
| 3,969,287 | 7/1976 | Jaworek | 260/8 |
| 4,008,195 | 2/1977 | Ishizuki et al. | 260/29.2 N |
| 4,051,091 | 9/1977 | Shibayama et al. | 260/29.2 TN |
| 4,070,348 | 1/1978 | Krämer et al. | 526/910 |
| 4,116,941 | 9/1978 | Hanson | 260/29.2 N |

FOREIGN PATENT DOCUMENTS

1036426  8/1958 Fed. Rep. of Germany .
1184139  3/1970 United Kingdom .

OTHER PUBLICATIONS

J. Polymer Sci. Symposium, No. 47, 77–87 (1974), Kramer et al., (II), Enzymes Covalently Bound . . . Gel Beads . . . Biomacromolecules.

*Primary Examiner*—Harold D. Anderson
*Attorney, Agent, or Firm*—Cushman, Darby & Cushman

[57] ABSTRACT

Water soluble polyester-imide prepolymers are prepared (1) having 5 to 60%, preferably at least 35%, of moieties (2) an excess hydroxyl content in excess of 60% and preferably more than 100%, and (3) a number average molecular weight of 600–1300. To water solubilize the prepolymers formed, there are added amines, preferably tertiary amines. The products are useful as wire enamels. To enhance the thermoplastic flow of the enamel, there are added organic titanates.

24 Claims, No Drawings

WATER-SOLUBLE POLYESTER IMIDE RESINS

This is a continuation of application Ser. No. 694,432 filed June 9, 1976, now abandoned.

BACKGROUND

Polyester-imide wire coatings thinned in conventional cresylic acid/aromatic hydrocarbon solvent blends have been used commercially for a number of years. Taking the base polymer one can solubilize it in water along with an amine. In attempting to use the same curatives as are employed in the non-aqueous or organic solvent system previously mentioned it was soon discovered that they were insoluble in water. This necessitated a search for crosslinkers that were soluble in water, and those were mainly organic titanates, such as Tyzor TE and LA which are titanium chelates of triethanolamine and the ammonium lactate salt, respectively.

Following the teachings of Meyer et al in U.S. Pat. No. 3,426,098, (the entire disclosure of which is hereby incorporated by reference and relied upon) if one were to take any of the polyester-imide base polymers and solubilize it with distilled water, an amine, a polar solvent and modify it with Tyzor TE, the baked enamel on copper wire would be out-of-round or eccentric, grainy or rough because of poor flow in the wire tower during the baking or curing operation. Extensive wire tower runs with another standard polyester-imide base having a fixed diimidediacid molar content in relation to the terephthalic acid molar content present all ran with an appearance rating of five (5) with or without a heavy grain and/or rough or blistery.

The present invention relates to novel polyester-imides and wire enamels prepared therefrom that are truly water-soluble, transparent, and truly clear in appearance.

It is an object of the present invention to prepare novel polyester-imides.

Another object is to prepare novel wire enamels containing polyester polyimides that are not only water-soluble, but soluble in the conventional cresylic acid-/aromatic hydrocarbon blends and in each case perform equally as well.

An additional object is to prepare electrical conductors having improved high temperature resistant coatings.

A further object is to prepare wire enamels having unusually good flexibility aging and heat shocks as compared to presently available polyester wire enamels.

Another object of this invention is to prepare heat-resistant wire enamels that have good heat shocks at 200° C. without the use of a topcoat, such as polyethylene terephthalate, nylon, or an amide-imide polymer.

SUMMARY OF THE INVENTION

It has now been found that these objects can be obtained by preparing a polyester-imide having the following characteristics:
1. An imide content higher than 35%.
2. An excess hydroxyl content in excess of 60 and, preferably, more than 100% so that the OH/COOH ratio is 1.8/1 to 2.50/1, and preferably 2.20–2.50/1.
3. The number average molecular weight of the base polyester-imide polymer is much lower than the organic solvent soluble counterpart, namely 600–1300 for the new polymer of the invention versus greater than 1300 for the conventional types.

The imide and ester moieties content can be five (5) to 60 percent of the total of imide moiety and polyester. Preferably, the polyimide content is 35–55% of the total.

Unless otherwise indicated, all parts are by weight.

As the imide forming components, there can be used (a) anhydrides, such as trimellitic anhydride, etc. and (b) polyamines, preferably aromatic amines, such as methylene dianiline, oxydianiline, phenylene diamines, etc. Additional aromatic tricarboxylic anhydrides include 3,4,3'-benzophenone tricarboxylic acid anhydride and hemimellitic anhydride. Other polyimide forming anhydrides are shown in Meyer U.S. Pat No. 3,426,098. The preferred anhydride is trimellitic anhydride.

Other polyamines include 3,3'-diamino-diphenyl, benzidine, 1,4-diaminonaphthalene, p-phenylene diamine, ethylene diamine, nonamethylene diamine, hexamethylene diamine, diaminodiphenyl ketone, bis (4-aminophenyl)-α,α'-p-xylene,m-phenylene diamine, m-xylylene diamine, 4,4'-dicyclohexylmethane diamine, diaminodiphenyl sulfone, octamethylene diamine, p-xylylene diamine, 3,3'-dichlorobenzidine, 3,3'-dimethyl benzidine, 3,4'-diaminodiphenyl ether, 4,4'-diaminodiphenyl propane, 3,3'-diaminodiphenyl sulfone.

The preferred diamines are methylene dianiline and oxydianiline.

Reactants (a) and (b) are usually employed in an amount of approximately two (2) moles of (a) per mole of (b) to form the diimide-diacid. This reaction product may be represented as follows:

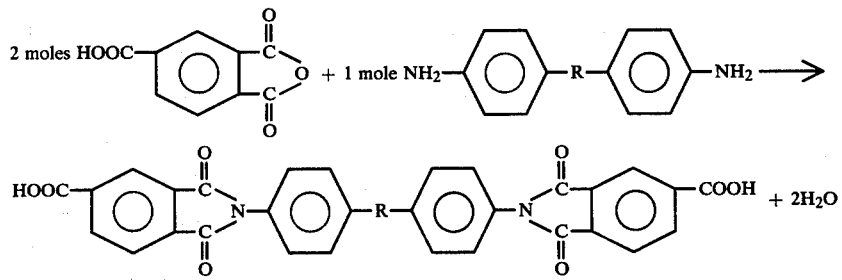

where R is CH$_2$ in the case of methylene dianiline or the oxygen atom (O) in the case of oxydianiline.

Then in the formulation of the polymer, this diimidediacid is considered as a portion of the total dicarboxylic acid content which contains predominately aromatic diacids with or without a minor quantity of aliphatic diacids. The preferred major diacid is terephthalic acid, although benophenone-4,4'-dicarboxylic acid performs equally as well and isophthalic acid or mixtures thereof follow very closely. Other aromatic dibasic acids include naphthalene-1,4-dicarboxylic acid, naphthalene-1,5-dicarboxylic acid, 4,4'-dicarboxydiphenyl sulfide, 4,4'-dicarboxydiphenyl sulfone, 3,3'-dicarboxydiphenyl sulfone, 4,4'-dicarboxydiphenyl ether, 4,4'-dicarboxydiphenyl methane, 4,4'-dicarboxydiphenyl ketone, 4,4'-dicarboxydiphenyl propane. When aliphatic carboxylic acids are included, e.g., in an amount up to 50 equivalent percent of the total acid, there can be used for example adipic acid, sebacic acid, maleic acid (or its anhydride), azelaic acid, glutaric acid.

These diacids may then be subsequently esterified by polyols, such as tris(2-hydroxyethyl) isocyanurate (THEIC) alone, or in admixture with dihydric alcohols, such as ethylene glycol, neopentyl glycol, propylene glycol, diethylene glycol, 1,3-hydroxyethyl, 5,5'-dimethyl hydrantoin and others in various ratios.

Additional dihydric alcohols include butanediol-1,4,-trimethylene glycol, pentanediol-1,5, butene-2-diol-1,4,2,2,4,4-tetramethyl-1,3-cyclobutanediol, 1,4-cyclohexane dimethanol, hexanediol-1,6,decanediol-1,10, dipropylene glycol, 4,4'-di(hydroxymethyl) diphenyl, 4,4'-di(hydroxymethyl) diphenyl methane, 4,4'-di(hydroxymethyl) diphenyl sulfone. The preferred dihydric alcohols are used in the two working examples.

In place of THEIC, there can be used in whole or in part other alcohols containing at least three hydroxyl groups such as glycerine, trimethylol propane, 1,2,6-hexanetriol, pentaerythritol, trimethylol ethane, 3-methyl-1,3,5-hexanetriol. The preferred alcohol containing at least three hydroxyl groups is THEIC. The products using THEIC surprisingly are more soluble in water than those using glycerine. It is unexpected that the larger molecule gives a more water soluble product. Because the THEIC gives a more water soluble product less cosolvent need be employed in employing the products.

Based on the total polyhydric alcohol usually 10 to 90% of the total equivalents is supplied by dihydric alcohol and the balance by the alcohol containing at least three hydroxyl groups.

The preparation of the polyester-imide is not restricted to any specific sequence of reactions. All the reactants may be charged to the reactor initially, heated to 400°–460° F. and reacted in situ. In another instance a particular sequence is followed whereby a polyamine, an aromatic anhydride and polyols are heated together to complete the imidization process, and then the aromatic dicarboxylic acid or its alkyl ester is subsequently added to form the polyester component under suitable reaction conditions. The polyester-polyimide reaction is usually carried out in the absence of solvent, although it is not precluded to employ solvent. In attaining the best balance of properties with respect to heat shock, thermoplastic flow or cut-through temperature, and a smooth, concentric baked film (related to runnability) it was found that a high diimide-diacid content combined with a high excess of hydroxyl content favored a relatively low molecular weight polymer that accomplished these objectives.

With respect to the determination of diimide-diacid content, earlier mention was made of its formation by the reaction of approximately two moles of an aromatic anhydride with one mole of an aromatic diamine. The combination of the molar content of this product and an aromatic diacid or aromatic-aliphatic diacid mixture is used to calculate the percentage of each. An example of this would be:

| | Mols | | | Mols |
|---|---|---|---|---|
| Trimellitic Anhydride | 1.00 | } | or diimide diacid | 0.50 |
| Methylenedianiline | 0.50 | | | |
| Terephthalic Acid | 0.50 | | Terephthalic Acid | 0.50 |

Thus, on a mol percent basis the diimide diacid content would be 50%. These calculations will appear later in the examples shown both as mol percent of diimide diacid and regular diacid and as mol percent of the total reactants employed in the formation of the polyester-imide base polymer.

In the preparation of the polyester an excess of alcoholic groups (OH) over acid groups (COOH) is preferred in order to get better flow on wire due to the formation of a lower molecular weight polymer with a lower softening point range. This may be expressed as an OH/COOH ratio range of 1.80/1 to 2.50/1, and preferably 2.20/1 to 2.50.1. In other words, an excess of OH groups over COOH groups of 80 to 150% is required to get the flow and other properties needed.

The polyester-imide wire enamel is modified by the incorporation of 1–10%, preferably 2–5%, of an organic titanate, such as a titanate chelate or salt or an alkyl titanate based on the total solids of the enamel. The addition of an adjuvant of this type enhances the thermoplastic flow properties of the enamel. Typical examples of suitable titanates include the triethanolamine chelate of titanium, known as Tyzor TE, and the ammonium lactate salt of titanium, known as Tyzor LA. These titanates and any others that are hydrolytically stable can be used as crosslinking agents. Thus, there can be used titanium acetylactate.

Organic alkyl titanates, such as Tyzor TPT (tetraisopropyl titanate), TBT (tetrabutyl titanate) tetrahexyl titanate and others that ordinarily undergo rapid hydrolysis in the presence of water may be pre-reacted with the prepolymer previously thinned in a polar solvent. They may be subsequently solubilized in an amine and water without any deleterious effects. This technique is demonstrated in example 9(b), 10(b), 12(b) and 13(b).

There is no need to employ solvents during the preparation of the polyester-imide prepolymer. Solvents of the polar type may be subsequently employed as cosolvents with distilled water in the preparation of aqueous solutions. Conventional cresylic acid-aromatic hydrocarbon (e.g., xylene) blends may also be used to make solvent-type wire enamels that perform equally as well as the aqueous types. For a comparison of wire properties of solvent versus water-based enamels using the same polymer, see Table I for details.

To solubilize these inherently water-insoluble resinous prepolymers in water, various amines may be employed that react with the free carboxyl groups or amic acid groups available to form the salts that are soluble in water. These amines may be of the alkyl, alkanolamine, or morpholine types. In general, the tertiary amines work best from the standpoint of fast cure, and least moisture sensitivity in the resultant baked film. Thus, there can be used trialkyl amines, N-alkyldiethanolamine, N,N-dialkyl alkanolamines, N-alkyl morpholine, N-hydroxyalkyl morpholine, etc. The alkyl group is usually lower alkyl, e.g., of 1 to 4 carbon atoms.

Typical examples of tertiary amines are:

triethyl amine,
trimethyl amine,
tributyl amine,
triethanolamine
N,N-dimethyl ethanolamine (a preferred tertiary amine)
N,N-diethyl ethanolamine
N,N-diisopropyl ethanolamine
N-N- dibutyl ethanolamine triisopropanolamine
N,N-dibutyl isopropanolamine
N-methyl diethanolamine (a preferred tertiary amine)
N-ethyl diethanolamine,
N-propyl diethanolamine
N-methyl morpholine
N-ethyl morpholine
N-(2-hydroxyethyl) morpholine
2-amino-2-methyl 1-propanol
2-dimethylamino-2-methyl 1-propanol A sufficient quantity of amine is employed to raise the pH of the aqueous solution to a range of 7-9, and preferably 7.5-8.5.

The incorporation of a polar solvent, as a minor component of a water/co-solvent blend, enhances the flow during cure of the enamel, and, ultimately, the smoothness and concentricity of the resultant baked film. The amount of polar solvent, when present, is preferably 10 to 25%.

Typical polar solvents that may be used are principally water-miscible, although cresylic acid may be incorporated in judicious amounts as well. They are:

N-methyl pyrrolidone
butyrolactone
dimethyl sulfoxide
diacetone alcohol
dioxane
glycol ethers, e.g., methoxyethanol, ethoxyethanol, butoxyethanol, diethylene glycol monomethyl ether
alcohols, e.g., ethyl alcohol, isopropyl alcohol, methyl alcohol, glycols such as ethylene glycol, diethylene glycol, triethylene glycol, trimethylene glycol, propylene glycol, dipropylene glycol
ketones, e.g., acetone, methyl ethyl ketone
glycol ether acetates, e.g., methoxyethyl acetate, ethoxyethylacetate, butoxyethyl acetate
glycol diethers, e.g., diethylene glycol dimethyl ether, diethylene glycol diethyl ether The amount of cosolvent incorporated along with water may range from 0-40% of the total blend, and preferably 10-25%, e.g., 20%.

As a result of the use of low molecular weight prepolymers the solids of either water- or solvent-based enamels are much higher than the conventional solvent-based enamels, namely in the 50-55% solids range for both of the former versus 30-35% for the latter. The general solids range may be 40-65%, and the preferred range is 45-60%.

The products of the invention are applied to the wire, like conventional wire enamels, by means of dies, felt wipe or free dip.

The following polyester-imide examples illustrate the invention:

Example 1 a. Preparation of Polymer

| Reactants | Weight grams | Mols | Mol % of Total Diacids | Mol % of Total Reactants |
|---|---|---|---|---|
| (A) Ethylene Glycol | 273 | 4.40 | | 36.55 |
| (B) Tris(hydroxyethyl) isocyanurate (THEIC) | 935 | 3.58 | | 29.73 |
| (C) Trimellitic Anhydride (TMA)* | 603 | 3.14 | | |
| (D) Methylene Dianiline (MDA)* | 310 | 1.56 | | |
| (E) Terephthalic Acid | 415 | 2.50 | 61.58 | 20.76 |
| | | 1.56 | 38.42 | 12.96 |

*or as Diimide Diacid
OH/COOH = 2.40/1

Materials A, B, C, D and E were charged into a five liter, three-necked flask equipped with an agitator driven by an electronically-controlled motor, gas inlet tube, thermometers for flask and distilling head, 3-bubblecap Snyder fractionating column and water-cooled condenser. A blanket of nitrogen was applied to the charge, and the temperature increased gradually to 450°-460° F., and held there until the desired physicals were attained. At a viscosity of U ¼ as measured at 30% solids in cresylic acid the reaction was terminated, and the melt discharged into a pan to solidify.

b. Preparation of Aqueous Wire Enamel

The hard resin was then fractured into small chunks, and 400 grams of the polymer along with 50 grams of N-methyl pyrrolidone (NMP) was charged to a 3-liter, 3-neck round-bottom flask, and heated to 250°-270° F. until the polymer was fluid and dissolved. At a temperature of 240°-250° F. a mixture of 50 grams each of distilled water and dimethylethanolamine (DMEA) were added to the flask carefully. Additional water, amine, and solvent were added to reduce the viscosity to Z (on the Gardner-Holdt scale), obtain a pH of 7.5-8.5, and a solids of 53.3%. Then on a solids-to-solids basis 4.5% Tyzor TE was added to the solution to make the finished enamel having a viscosity of X ¼, a pH of 8, and a solids of 54.1%.

EXAMPLE 2 a. Preparation of Polymer

| Reactants | Weight Grams | Mols | Mol % of Total Diacids | Mol % of Total Reactants |
|---|---|---|---|---|
| (A) Ethylene Glycol | 273 | 4.40 | | 39.82 |
| (B) THEIC | 935 | 3.58 | | 32.40 |
| (C) TMA* | 603 | 3.14 | | |
| (D) MDA* | 310 | 1.57 | | |
| (E) Terephthalic Acid | 249 | 1.50 | 48.86 | 13.57 |
| | | 1.57 | 51.14 | 14.21 |

*or as Diimide Diacid
OH/COOH = 3.19

The same equipment and procedure as outlined in example 1(a) was employed in preparing this polymer. It was controlled to a final viscosity of R ¼ as measured at 30% solids in cresylic acid, and then discharged into a pan to solidify.

b. Preparation of Aqueous Wire Enamel

Using the same equipment and procedure as described in example 1(b) an aqueous enamel was prepared by blending 500 grams of base polymer 2(a) with 62.5 grams NMP, 65 grams DMEA, 250 grams of distilled water, and 28.1 grams Tyzor TE to provide an enamel having the following liquid characteristics: Viscosity—W ½, pH—8.35, % Solids—57.7.

EXAMPLE 3 a. Preparation of Polymer

| Reactants | Weight Grams | Mols | Mol % of Total Diacids | Mol % of Total Reactants |
|---|---|---|---|---|
| (A) Ethylene Glycol | 440 | 7.10 | | 54.83 |
| (B) THEIC | 467 | 1.79 | | 13.82 |
| (C) TMA* | 603 | 3.14 | | |
| (D) MDA* | 310 | 1.56 | | |
| (E) Terephthalic Acid | 415 | 2.50 | 61.58 | 19.30 |
| | | 1.56 | 38.42 | 12.05 |

*or as Diimide Diacid
OH/COOH = 2.41

The same equipment and procedure as outlined in example 1(a) was employed in preparing this polymer. It was reacted until the molten mass was clear and free of unreacted matter, and monitored to a viscosity of U ½ measured at 30% solids in cresylic acid and then allowed to solidify.

b. Preparation of Aqueous Wire Enamel

With the same equipment and procedure as outlined in example 1(b) an aqueous wire enamel was prepared thusly:

To 500 grams of base polymer 3(a) 65 grams of NMP, 65 grams of DMEA, 252 grams of distilled water, and 28.1 grams of Tyzor TE were added to provide the following enamel properties:

Viscosity: X ¾
% Solids: 57.54

EXAMPLE 4 a. Preparation of Polymer

| Reactants | Weight Grams | Mols | Mol % of Total Diacids | Mol % of Total Reactants |
|---|---|---|---|---|
| (A) Ethylene Glycol | 273 | 4.40 | | 33.59 |
| (B) THEIC | 935 | 3.58 | | 27.33 |
| (C) TMA* | 385 | 2.00 | | |
| (D) MDA* | 198 | 1.00 | | |
| (E) Terephthalic Acid | 684 | 4.12 | 80.47 | 31.45 |
| | | 1.00 | 19.53 | 7.63 |

*or as Diimide Diacid
OH/COOH = 1.91/1

The same equipment and procedure as outlined in example 1(a) was employed in preparing this polymer. It was reacted until a sample was clear at 30% solids in cresylic acid, and then discharged into a pan to solidify.

b. Preparation of Aqueous Wire Enamel

With the same equipment and procedure as outlined in example 1(b) an aqueous wire enamel was prepared thusly:

To 500 grams of base polymer 4(A) 130 grams NMP, 50 grams DMEA and 520 grams distilled water were added to provide an enamel with the following liquid properties:

Viscosity: Y ½+
% Solids: 41.7

EXAMPLE 5 a. Preparation of Polymer

| Reactants | Weight Grams | Mols | Mol % of Total Diacids | Mol % of Total Reactants |
|---|---|---|---|---|
| (A) Ethylene Glycol | 523 | 8.436 | | 62.96 |
| (B) THEIC | 234 | 0.897 | | 6.69 |
| (C) TMA* | 603 | 3.140 | | |
| (D) MDA* | 310 | 1.566 | | |
| (E) Terephthalic Acid | 415 | 2.500 | 61.49 | 18.66 |
| | | 1.566 | 38.51 | 11.69 |

*or as Diimide Diacid
OH/COOH = 2.41/1

The same equipment and procedure as outlined in example 1(a) was employed in preparing this polymer. It was reacted until a sample was clear at 30% solids in cresylic acid, and then discharged into a pan to solidify.

b. Preparation of an Aqueous Wire Enamel

With the same equipment and procedure as outlined in example 1(b) an aqueous wire enamel was prepared thusly:

To 500 grams of base polymer 5(a) there were added 63 grams NMP, 50 grams DMEA, 252 grams distilled water and 28 grams Tyzor TE to provide an enamel with the following liquid properties:

Viscosity: X ¾
% Solids: 58.5

EXAMPLE 6 a. Preparation of Polymer

| Reactants | Weight Grams | Mols | Mol % of Total Diacids | Mol % of Total Reactants |
|---|---|---|---|---|
| (A) Ethylene Glycol | 788 | 12.710 | | 70.64 |
| (B) TMA* | 784 | 4.083 | | |
| (C) MDA* | 403 | 2.035 | | |
| (D) Terephthalic Acid | 539 | 3.247 | 61.47 | 18.05 |
| | | 2.035 | 38.53 | 11.31 |

*or as Diimide Diacid
OH/COOH = 2.41/1

The same equipment and procedure as outlined in example 1(a) was employed in preparing this polymer. It was controlled to a final viscosity of I ¾ measured at 30% solids in cresylic acid, and then discharged into a pan to solidify.

b. Preparation of a Solvent-Based Wire Enamel

To 400 grams of base polymer 6(a) there were added 314 grams cresylic acid and 186 grams of petroleum naphtha (aromatic hydrocarbon) and heated to 300° F. until the polymer was completely dissolved. Then the flask contents were cooled to 160° F. and 65 grams cresylic acid, 35 grams petroleum naphtha, 50 grams of a cresol-phenolic condensate at 40% solids, and 110 grams of a trimer of toluenediisocyanate at 40% solids, were added and mixed until the solution was homogeneous. Eighteen grams TPT (tetraisopropyl titanate) was added at 160° F. The batch temperature was increased to 250° F. and held there for two hours. Its liquid properties were:
Viscosity: G ½
% Solids: 40

Since this solvent-based enamel turned cloudy on standing after a week, no aqueous version thereof was made.

EXAMPLE 7 a. Preparation of Polymer

| Reactants | Weight Grams | Mols | Mol % of Total Diacids | Mol % of Total Reactants |
|---|---|---|---|---|
| (A) Diethylene Glycol | 425 | 4.009 | | 32.24 |
| (B) THEIC | 850 | 3.257 | | 26.20 |
| (C) TMA* | 548 | 2.854 | | |
| (D) MDA* | 282 | 1.424 | | |
| (E) Terephthalic Acid | 466 | 2.807 | 54.3 | 22.58 |
| (F) Azelaic Acid | 176 | 0.936 | 18.1 | 7.53 |
| | | 1.424 | 27.6 | 11.45 |

*or as Diimide Diacid
OH/COOH = 1.72/1

Procedure

The technique employed in this example involves reacting the various chemicals in a definite sequence. Reactants (A), (B) and (C) were charged into a five liter, three-necked flask equipped with a motor-driven agitator, gas inlet tube, a Dean-Stark water trap fitted with a thermometer and water-cooled condenser. The flask was blanketed with nitrogen and the temperature raised to 228° F. At 228° F. material "D" was added to the flask and the temperature gradually raised to 320° F. at which distillation commenced. The reaction was continued until all of the TMA had reacted and the temperature peaked at 410° F. and 72 mls. of water as distillate had been collected. The batch was cooled to 338° F. and material (E) was added. The temperature was gradually raised to 450° F. and held until another 98 mls. of distillate was collected and a smaple of melt as a pill was clear cold. Batch was cooled to 320° F. and material (F) was added. The temperature was raised to 330° F. and periodically sampled for progress of the reaction as measured by an increase in viscosity. When a viscosity of T ¾+ of a resin sample thinned to 30% solids in cresylic acid was attained, the flask's contents were discharged shortly thereafter into a metal gallon can and allowed to harden.

b. Preparation of Aqueous Wire Enamels

Enamel-1

With the same equipment and procedure as outlined in example 1(b) an aqueous wire enamel was prepared thusly:

To 220 grams of base polymer 7(a), there were added 110 grams butoxy ethanol, 11 grams of DMEA, 440 grams distilled water, 12.4 grams hydroxymethylated derivative of diacetone acrylamide (HMDAA) and 4.8 grams Tyzor LA to provide an enamel with the following liquid properties:
Viscosity: X ¾
pH: 8.0
% Solids: 28.7

Enamel -2

The same equipment as outlined in example 1(b) was employed, but the procedure for preparing the aqueous wire enamel was different, namely:

To 240 grams of base polymer 7(a) there were added 60 grams of butoxy ethanol, and the two were heated to 290° F. until the polymer was completely dissolved. Then 7.2 grams of Tyzor TPT (tetraisopropyl titanate) were added at 290° F. Then the temperature was raised to 320° F. and held there for one hour. The flask contents were cooled to 250° F. and 50 grams of butoxy ethanol were added and mixed until homogeneous. Then 15 grams DMEA and 440 grams distilled water were added, and the mixture stirred until solution was clear and uniform. Its liquid properties were:
Viscosity: M ¼
pH: 8.06
% Solids: 29.56

EXAMPLE 8 a. Preparation of Polymer

| Reactants | Weight Grams | Mols | Mol % of Total Diacids | Mol % of Total Reactants |
|---|---|---|---|---|
| (A) Diethylene Glycol | 425 | 4.009 | | 32.25 |
| (B) THEIC | 850 | 3.257 | | 26.20 |
| (C) TMA* | 274 | 1.427 | | |
| (D) p-Amino Benzoic Acid* | 195 | 1.423 | | |
| (E) Terephthalic Acid | 466 | 2.807 | 54.33 | 22.58 |
| (F) Azelaic Acid | 176 | 0.936 | 18.12 | 7.52 |
| | | | 27.55 | 11.45 |

*Monoimide-Diacid
OH/COOH = 1.72/1

The same equipment and procedure as outlined in example 7(a) was employed in preparing this polymer. It was controlled to a final viscosity of R ¼ measured at 30% solids in cresylic acid, and then discharged into a pan to solidify.

b. Preparation of Aqueous Wire Enamels

Enamel -1

With the same equipment and procedure as outlined in example 1(b) an aqueous wire enamel was prepared thusly:

To 640 grams of base polymer 8(a) there were added 270 grams butoxyethanol, 22 grams DMEA and 540 grams distilled water to provide an enamel with no curative incorporated therein, and having the following liquid properties:
Viscosity: Q ¼
pH: 7.8
% Solids: 43.5

Enamel -2

To 850 grams of enamel -1 above, 20.8 grams of HMDAA and eight (8) grams of Tyzor LA were added as curing agents. Its liquid properties were:
Viscosity: Q ¼
pH: 7.8
% Solids: 42.2

EXAMPLE 9 a. Preparation of Polymer

| Reactants | Weight Grams | Mols | Mol % of Total Diacids | Mol % of Total Reactants |
|---|---|---|---|---|
| (A) Diethylene Glycol | 493 | 4.651 | | 39.10 |
| (B) Glycerine (96%) | 199 | 2.077 | | 17.46 |
| (C) TMA* | 548 | 2.854 | | |
| (D) MDA* | 282 | 1.424 | | |

-continued

| Reactants | Weight Grams | Mols | Mol % of Total Diacids | Mol % of Total Reactants |
|---|---|---|---|---|
| (E) Terephthalic Acid | 466 | 2.807 | 54.30 | 23.60 |
| (F) Azelaic Acid | 176 | 0.936 | 18.10 | 7.87 |
| | | 1.424 | 27.60 | 11.97 |

*or as Diimide Diacid
OH/COOH = 1.50/1

The same procedure and technique as outlined in example 7(a) was employed in preparing this polymer. It was controlled to a final viscosity of V ½+ at 30% solids in cresylic acid, and then discharged into a pan to solidify.

b. Preparation of Aqueous Wire Enamel

To 480 grams of base polymer 9(a) there were added 120 grams butoxyethanol and the two heated to 290° F. until the polymer was completely dissolved. Then 28.8 grams of a Tyzor TPT solution (50% in butoxy ethanol) was added slowly to the flask at 280° F. dropwise over a period of 65 minutes and the flask stirred until the mixture was uniform. The temperature was raised to 320° F. and held there for one hour. The flask contents were cooled to 250° F. and 75 grams butoxy ethanol were added, and stirring carried out until the solution was homogeneous. This was followed by the addition of 33 grams DMEA and 840 grams of distilled water and the mixture stirred until a homogeneous solution was obtained. Its liquid properties were:
Viscosity: M
pH: 8.1
% Solids: 30.4

EXAMPLE 10 a. Preparation of Polymer

| Reactants | Weight Grams | Mols | Mol % of Total Diacids | Mol % of Total Reactants |
|---|---|---|---|---|
| (A) Diethylene Glycol | 548 | 5.170 | | 43.48 |
| (B) Glycerine (96%) | 149 | 1.555 | | 13.08 |
| (C) TMA* | 548 | 2.857 | | |
| (D) MDA* | 282 | 1.424 | | |
| (E) Terephthalic Acid | 466 | 2.807 | 54.30 | 23.60 |
| (F) Azelaic Acid | 176 | 0.936 | 18.10 | 7.87 |
| | | 1.424 | 27.60 | 11.97 |

*or as Diimide Diacid
OH/COOH = 1.45/1

The same equipment and procedure as outlined in example 7(a) was employed in preparing this polymer. It was controlled to a final viscosity of V ¼+ measured at 30% solids in cresylic acid, and then discharged into a pan to solidify. The hard resin had a ball and ring melt point of 79° C.

b. Preparation of Aqueous Wire Enamel

The same equipment as outlined in example 1(b) was employed, but the procedure for preparing the aqueous wire enamel was different, namely:

To 480 grams of base polymer 10(a), 120 grams butoxy ethanol (previously dried over anhydrous CaSO₄) were added, and the two heated to 290° F. until the polymer was completely dissolved. The batch was cooled to 200° F. and 15 grams of Tyzor TPT added dropwise over a 20 minute period. At 220° F. 50 grams of butoxy ethanol were added and the temperature raised to 253° F. in ten minutes, and held there for two hours. The flask contents were cooled to 170° F. and 30 grams of DMEA and 200 grams of distilled water were added and mixed in until solution was homogeneous. An additional 30 grams butoxy ethanol and 655 grams distilled water were added to adjust the enamel to the following liquid properties:
Viscosity: V ¼
pH: 8.05
% Solids: 30.4

EXAMPLE 11 a. Preparation of Polymer

| Reactants | Weight Grams | Mols | Mol % of Total Diacids | Mol % of Total Reactants |
|---|---|---|---|---|
| (A) Diethylene Glycol | 578 | 5.453 | | 46.17 |
| (B) Glycerine (96%) | 114 | 1.190 | | 10.07 |
| (C) TMA* | 548 | 2.854 | | |
| (D) MDA* | 282 | 1.424 | | |
| (E) Terephthalic Acid | 466 | 2.807 | 54.30 | 23.77 |
| (F) Azelaic Acid | 176 | 0.936 | 18.10 | 7.93 |
| | | 1.424 | 27.60 | 12.06 |

*or as Diimide Diacid
OH/COOH = 1.40/1

The same equipment and procedure as outlined in example 7(a) was employed in preparing this polymer. It was reacted until the molten polymer was free of unreacted solid matter, i.e., clear and speck-free. A total of 218 mls. distillate was collected.

b. Preparation of Aqueous Wire Enamels

Unmodified Enamel

The same equipment as outlined in example 1(b) was employed in preparing this aqueous enamel without curatives or in an unmodified form, namely:

To 600 grams of base polymer 11(a) there were added 67 grams butoxy ethanol and the two heated to 290° F. until the polymer was completely dissolved. The temperature was lowered to 250° F. and 30 grams of DMEA was added, and mixed in until the solution was clear. Then 268 grams of distilled water were added, and the mixture stirred until homogeneous. An additional 480 grams of distilled water, 120 grams butoxy ethanol and 30 grams DMEA were added to adjust to the following liquid properties:
Viscosity: W ¼
pH: 7-8
% Solids: 37.8
% Butoxy-ethanol: 20 (of total solvent blend)

Enamel -1

To 700 grams of unmodified enamel 11(b) there were added 14.82 grams of HMDAA and 48.8 grams Tyzor LA, and the composition stirred until homogeneous. Its liquid properties were:
Viscosity: Y ½+
pH: 7.85
% Solids: 38.8

Enamel -2

To 800 grams of unmodified enamel 11(b) there were added 16.93 grams HMDAA and 34.87 grams Tyzor TE, and the composition was stirred until homogeneous. Its liquid properties were:
Viscosity: Q ¾
pH: 8.4
% Solids: 39.7

EXAMPLE 12 a. Preparation of Polymer

| Reactants | Weight Grams | Mols | Mol % of Total Diacids | Mol % of Total Reactants |
|---|---|---|---|---|
| (A) Diethylene Glycol | 425 | 4.009 | | 31.62 |
| (B) Dantocol DHEΔ | 202 | 1.074 | | 8.47 |
| (C) THEIC | 634 | 2.429 | | 19.16 |
| (D) TMA* | 548 | 2.854 | | |
| (E) MDA* | 282 | 1.424 | | |
| (F) Terephthalic Acid | 466 | 2.807 | 54.30 | 22.14 |
| (G) Azelaic Acid | 176 | 0.936 | 18.10 | 7.38 |
| | | 1.424 | 27.60 | 11.23 |

*or as Diimide Diacid
OH/COOH = 1.66/1
ΔManufactured by Glyco Chemicals, Inc. The chemical name is 1,3-bis(hydroxyethyl), 5,5'-dimethyl hydantoin.

The same equipment and procedure as outlined in example 7(a) was employed in preparing this polymer. It was controlled to a final viscosity of U ¾+ measured at 30% solids in cresylic acid, and then discharged into a pan to solidify.

b. Preparation of Aqueous Wire Enamel

To 480 grams of base polymer 12(a) there were added 120 grams butoxyethanol and the two were heated to 290° F. until the polymer was completely dissolved. Then 28.8 grams of a Tyzor TPT solution (50% in butoxyethanol) was added dropwise to the flask at 300° F. over a period of 85 minutes. This was followed immediately with the addition of 10 grams of butoxyethanol, and the temperature held at 300° F. for 90 minutes. At a temperature of 180° F., 25 grams of DMEA and 200 grams of distilled water were added, and the composition stirred until the solution was homogeneous. The enamel was very viscous and so an additional 42 grams of butoxyethanol and 504 grams of distilled water were added to adjust it to the following liquid characteristics:

Viscosity: X+
pH: 8.1
% Solids: 34.3

EXAMPLE 13 a. Preparation of Polymer

| Reactants | Wt. Grams | Mols | Mol % of Total Diacids | Mol % of Total Reactants |
|---|---|---|---|---|
| (A) Diethylene Glycol | 425 | 4.009 | | 32.28 |
| (B) THEIC | 850 | 3.257 | | 26.23 |
| (C) TMA* | 548 | 2.854 | | |
| (D) Oxydianiline* | 282 | 1.410 | | |
| (E) Terephthalic Acid | 466 | 2.807 | 54.47 | 22.60 |
| (F) Azelaic Acid | 176 | 0.936 | 18.17 | 7.54 |
| | | | 27.36 | 11.35 |

*or as Diimide Diacid
OH/COOH = 1.72/1

The same equipment and procedure as outlined in example 7(a) was employed in preparing this polymer. It was controlled to a final viscosity of U ¾+ at 30% solids in cresylic acid, and then dumped into a metal can to harden.

b. Preparation of Aqueous Wire Enamel

To 480 grams of base polymer 13(a) there were added 120 grams butoxyethanol and the two heated to 290° F. until the polymer was completely dissolved. Then 28.8 grams of a Tyzor TPT solution (50% in butoxyethanol) was added to the flask at 290° F. dropwise over a period of 50 minutes and the composition stirred until uniform. Immediately thereafter 40 grams of butoxyethanol were added, and the contents held at 300° F. for one hour. The batch was cooled to 135° F. and 30 grams of DMEA and 660 grams of distilled water were added, and the composition stirred until the solution was homogeneous. Its liquid properties were:

Viscosity: U ¾
pH: 7.8
% Solids: 35.3

EXAMPLE 14 a. Preparation of Polymer

| Reactants | Weight Grams | Mols | Mol % of Total Diacids | Mol % of Total Reactants |
|---|---|---|---|---|
| (A) Ethylene Glycol | 244 | 3.9355 | | 30.50 |
| (B) THEIC | 864 | 3.3103 | | 25.70 |
| (C) TMA* | 548 | 2.8542 | | |
| (D) MDA* | 282 | 1.4242 | | |
| (E) Terephthalic Acid | 271 | 1.6325 | 28.89 | 12.65 |
| (F) Terephthalic Acid | 270 | 1.6265 | 28.79 | 12.60 |
| (G) Benzoic Acid | 118 | 0.9672 | 17.12 | 7.50 |
| | | | 25.20 | 11.05 |

*or as Diimide Diacid

The same equipment and procedure as outlined in example 7(a) was employed in preparing this polymer. It was controlled to a final viscosity of V ¼+ at 30% solids in cresylic acid, and then discharged into a pan to solidify.

b. Preparation of Aqueous Wire Enamel

To 200 grams of base polymer 14(a) there were added 50 grams of N-methyl pyrrolidone and the two were heated to 270° F. The batch was cooled to 200° F. and 10 grams of DMEA and 150 grams of distilled water were added. After mixing for one hour the enamel was very viscous and 325 grams of distilled water, 50 grams of N-methyl pyrrolidone, 7 grams of DMEA and 10 grams of Tyzor TE were added to adjust the enamel to the following liquid properties:

Viscosity: H ½
pH: 7.9
% Solids: 25.93

To illustrate the excellent electrical properties of these aqueous wire enamels, several of the examples were selected and their solvent-based counterparts using the same base polymer were compared property-wise. In practically all properties the aqueous based enamels compared very favorably.

The solvent employed in the solvent based enamels in Table I was a mixture of cresylic acid and aromatic naphtha at a ratio of 65% to 35%, respectively.

After applying the enamels to the wire at room temperature, they were baked on in conventional manner at 900° F. Conventional baking temperatures can be employed, e.g., 700° to 900° F.

TABLE I

Solvent-Based Enamels vs. Water-Based Enamels Comparison of Wire Properties

| Wire Properties*- without topcoat | | Example 1(a) | | Example 2(a) | | Example 3(a) | |
|---|---|---|---|---|---|---|---|
| | | Solvent Based | Aqueous Ex.1(b) | Solvent Based | Aqueous Ex.2(b) | Solvent Based | Aqueous Ex.3(b) |
| Cut-through temperature, °C. | | 369–352 | 341–331 | 352–301 | 280–279 | 342–338 | 287–329 |
| Heat Shocks, @200° C. for ½ Hr. & 20% prestretch | 1X | 90 | 30 | 80 | 60 | 90 | 10 |
| | 2X | 90 | 70 | 80 | 90 | 100 | 80 |
| | 3X | 100 | 90 | 90 | 100 | 100 | 90 |
| | 4X | 100 | 100 | 90 | 100 | 100 | 90 |
| Appearance | | 4 | 3 | 4 | 4 | 3 | 3 |
| Mandrel, after snap | | 2X | 2X | 1X | 1X | 1X | 1X |
| Unidirect. Scrape | | 1350–1783 | 1275–1758 | 1700–1833 | 1500–1833 | 1800–1866 | 1350–1783 |
| Burnout Freon Resist. | | | 7.39 | | | | 6.80 |
| Dissipation Factor | | | OK–OK 13.64 | | | | OK–OK 25.53 |
| Dielectrics, KV Dry | | | 16.8 | | | | 17.8 |
| Wet | | | 12.3 | | | | 12.1 |
| Build, mils | | 2.9 | 3.1 | 3.2 | 3.0 | 3.0 | 3.2 |
| Tower Temp. @900° F. | | | | | | | |

*on AWG#18 Copper Wire

TABLE II

"Effect of Titanate Content on Dissipation Factor and Other Wire Properties"

| Polymer of Example 1 used in preparing enamels like Example 1(b) | | 2.5 | 3.5 | 4.5 | 9.0 |
|---|---|---|---|---|---|
| Wire Properties* without topcoat | | | | | |
| Dissipation Factor | | 9.88 | 11.35 | 25.53 | 36.67 |
| Cut-Through Temp., °C. | | 319–325 | 301–326 | 287–329 | 292–315 |
| Heat Shocks @200° C. for ½ Hr. and 20% pre-stretch | 1X Mandrel | 10 | 0 | 10 | 30 |
| | 2X Mandrel | 70 | 70 | 80 | 80 |
| | 3X Mandrel | 90 | 100 | 90 | 100 |
| | 4X Mandrel | 100 | 100 | 90 | 100 |
| Appearance or Runnability | | 3 | 4 | 3 | 3 |
| Mandrel after Snap | | 2X | 2X | 1X | 2X |
| Unidirectional Scrape | | 1175–1425 | 1000–1600 | 1350–1783 | 2000–2000 |
| Burnout Freon 22 Resistance | | — | — | 6.80 | 7.38 |
| Dielectrics, dry, KV | | — | — | OK/OK | OK/OK |
| Dielectrics, wet, KV | | — | — | 17.8 | 12.9 |
| Build or Film Thickness | | — | — | 12.1 | 8.1 |
| Speed, ft./min. | | 3.0 | 3.1 | 3.2 | 3.2 |
| Tower Temperature @900° F. | | 45 | 45 | 45 | 45 |

*on AWG#18 Copper Wire

The effect of titanate content was studied with wire enamels prepared with the polymer of Example 1. As indicated in Table II, the principal effect of increased titanate content was the large rise in the dissipation factor. At the lower levels of 2.5 and 3.5% Tyzor TE, the dissipation factors of 9.88 and 11.35 were respectable, whereas at the higher levels of 4.5 and 9% Tyzor TE the values of 25.53 and 36.67 were much too high. The other wire properties were all quite comparable with those of solvent based enamels.

The compositions can comprise, consist essentially of, or consist of the materials set forth and the process can comprise, consist essentially of, or consist of the steps recited.

What is claimed is:

1. A water soluble thermosetting second polyester - imide prepolymer composition prepared by reacting reactants consisting essentially of a tertiary amine and a first polyester - imide prepolymr having a number average molecular weight of 600–1300, an OH:COOH ratio of from 1.8:1 to 2.5:1 and an imide content of 5 to 60% based on the total imide and ester moieties, the alcohol of the ester moiety consisting essentially of 10 to 90% of the total equivalents of dihydric alcohol and the balance of the alcohol containing at least three hydroxyl groups, the acid component of the ester moiety consisting essentially of dicarboxylic acid, the imide moiety consisting essentially of the reaction product of approximately two moles of an aromatic monocarboxylic acid monoanhydride with one mole of an aromatic diamine.

2. A composition according to claim 1, including a titanate curing agent.

3. A composition according to claim 2, wherein the titanate is a water soluble titanate.

4. A composition according to claim 1, dissolved in water said composition being suitable for use as a wire enamel.

5. A composition according to claim 4, including a minor amount of a water soluble polar organic solvent.

6. A composition according to claim 5, including a water soluble titanate curing agent.

7. A composition according to claim 1, wherein the aromatic trimonocarboxylic acid monoanhydride is trimellitic anhydride.

8. A composition according to claim 7, wherein the alcohol of the ester moiety comprises tris(hydroxyethyl)isocyanurate.

9. A composition according to claim 8 wherein the acid of the ester moiety comprises terephthalic acid or isophthalic acid.

10. A composition according to claim 9, wherein the acid of the moiety comprises terephthalic acid.

11. A composition according to claim 10, wherein the acid of the moiety comprises a diimide-dicarboxylic acid wherein the imide groups are contained in five-membered imide rings.

12. A composition according to claim 11, wherein the moiety is the imide of 2 moles of trimellitic anhydride and 1 mole of oxydianiline or methylene dianiline.

13. A composition according to claim 12, wherein the imide is 35 to 55% of the total of imide and ester moieties.

14. A composition according to claim 13, wherein the ratio of OH:COOH is from 2.20 to 2.50:1.

15. A composition according to claim 14 including a titanate curing agent for polyesters.

16. A composition according to claim 15, wherein the titanate is water soluble.

17. A process for preparing the composition of claim 5 comprising dissolving first prepolymer in a water soluble polar organic solvent and then adding water, there also being added a tertiary amine.

18. A composition according to claim 5, wherein the organic solvent is N-methyl pyrrolidone, butyrolactone, dimethyl sulfoxide, diacetone alcohol, dioxane, a mono alkoxy ether of a glycol, a glycol, a ketone, a mono alkoxy ether of a glycol acetate, an alkanol or a dialkoxy ether of a glycol and is present in an amount of 10 to 40% of the total solvent.

19. A composition according to claim 5, wherein the tertiary amine is an alkyl alkanolamine, an alkyl morpholine or a hydroxyalkyl morpholine.

20. A composition according to claim 5, wherein the tertiary amine is dimethyl ethanolamine.

21. A composition according to claim 15, wherein the tertiary amine is dimethyl ethanolamine.

22. A composition according to claim 1 wherein the alcohol having at least three hydroxyl groups is tris (hydroxyethyl) isocyanurate, glycerine, trimethylol propane, 1,2,6-hexanetriol, pentaerythritol, trimethylol ethane or 3-methyl-1,3,5-hexanetriol or mixtures thereof.

23. A composition according to claim 4 wherein the alcohol having at least three hydroxyl groups is tris (hydroxyethyl) isocyanurate, glycerine, trimethylol propane, 1,2,6-hexanetriol, pentaerythritol, trimethylol ethane or 3-methyl-1,3,5-hexanetriol or mixtures thereof.

24. A composition according to claim 4 consisting essentially of (1) said second polyester-imide prepolymer, (2) the water soluble titanate curing agent and (3) a solvent which is either (a) water or (b) a mixture of water and a minor amount of a water soluble polar organic solvent.

* * * * *